July 26, 1955  J. B. HARRISON  2,713,922
VEHICLE LIFT
Filed Sept. 6, 1952  2 Sheets-Sheet 1
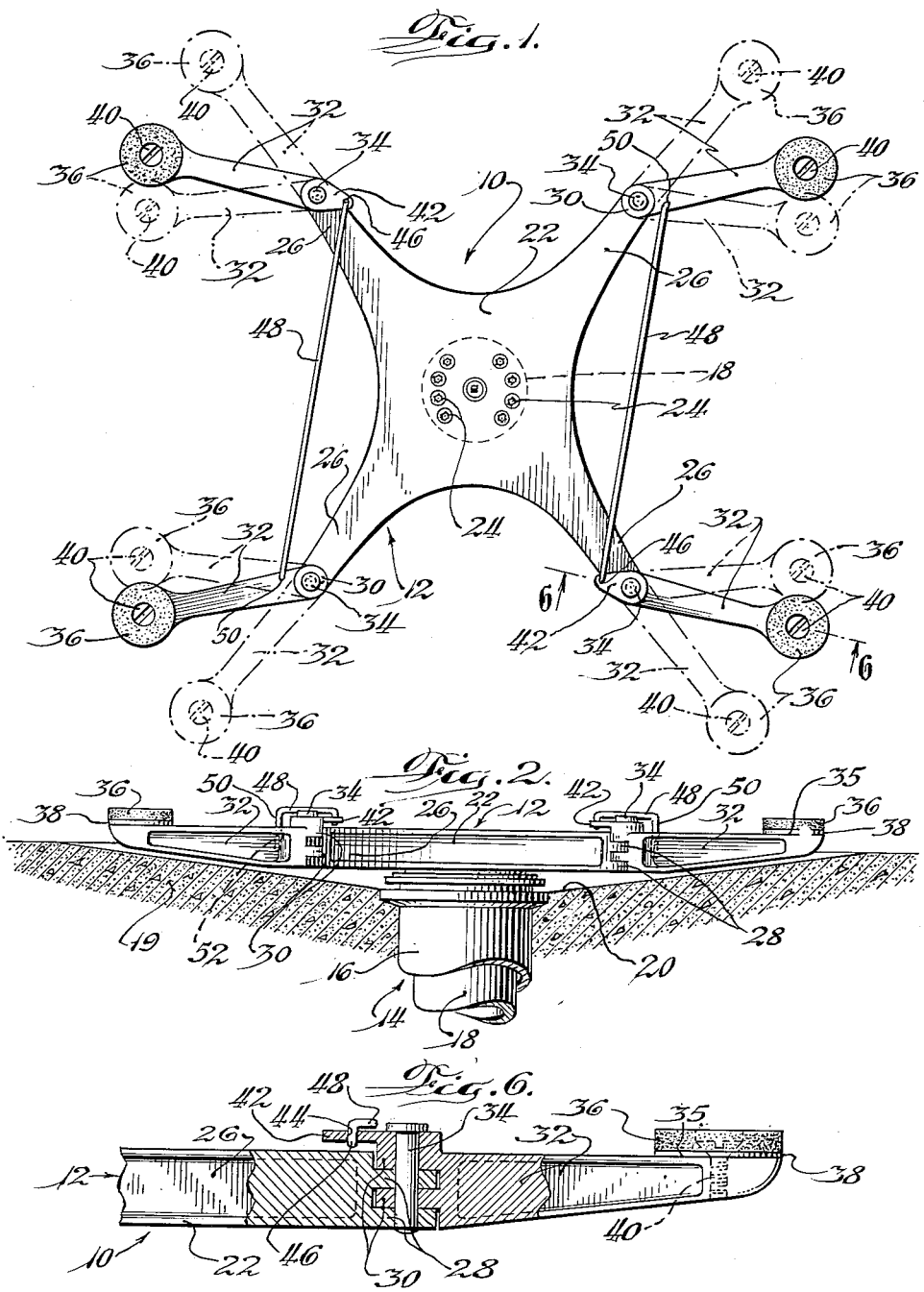
Inventor:
John Bertram Harrison
By Ahlberg, Kuipper & Gradolph
Attorneys.

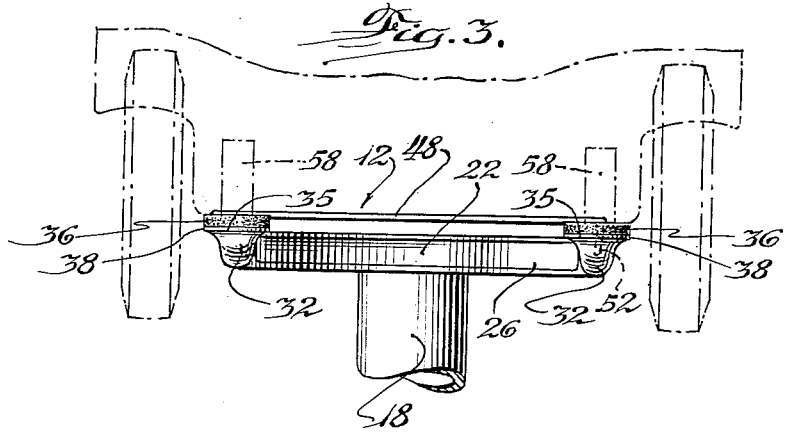
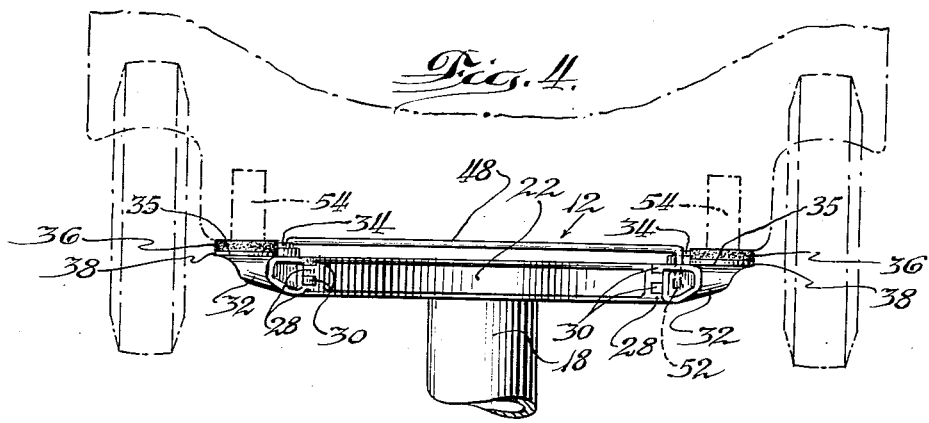
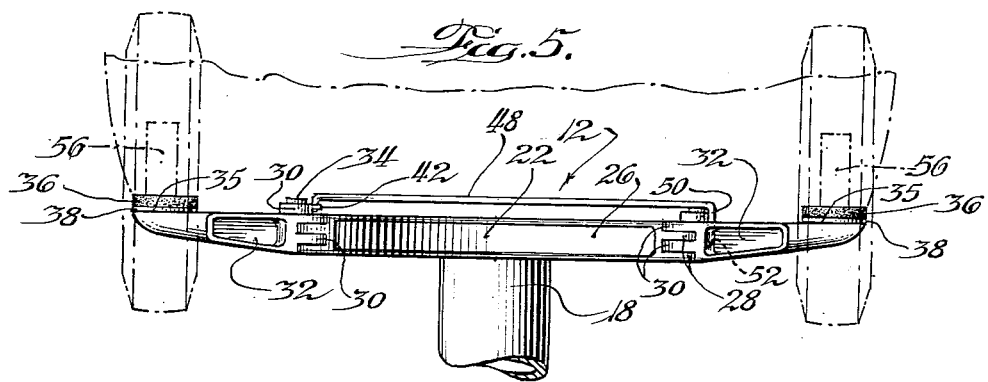

United States Patent Office 2,713,922
Patented July 26, 1955

2,713,922
VEHICLE LIFT

John Bertram Harrison, Memphis, Tenn., assignor to Rotary Lift Company, Memphis, Tenn., a corporation of Delaware Application September 6, 1952, Serial No. 308,277

5 Claims. (Cl. 187—8.75)

The present invention relates to vehicle lifts and in particular to a new and improved lift for raising automobiles of various widths and body styles for servicing.

At present there are two general types of automobile, bus and truck lifts in general use in garages and service stations throughout the country. One of these is the so-called "roll on" lift wherein a pair of spaced parallel tracks are provided onto which the vehicle is driven when the tracks are in their lowered position adjacent the ground. Suitable supporting and bracing structure mounts the tracks on a lifting mechanism which may be operated to raise the tracks and vehicle to the height desired to enable the service man or attendant to pass beneath the vehicle and to give it his attention. The other type of lift in general use is the "free wheel" lift which comprises a pair of spaced parallel rails secured to the lifting mechanism. The vehicle is driven over the rails, when lowered, so that the wheels straddle them, and the lifting mechanism is operated to move the rails upwardly to engage the underside of the vehicle, usually at the rear axle housing and beneath the front axle or, in later model cars, beneath the front wheel suspension structure. Lifts of the "free wheel" type are provided with some means movable on the rails to engage the axle housing and the front wheel suspension structure in order to properly support the vehicle on the rails.

These prior art lifts have the disadvantage of putting the supporting structure in the way of the attendant or mechanic who is attempting to lubricate or repair the vehicle from below.

Furthermore, these conventional lifts have the disadvantage of not being usable with all types of automobiles.

In order to illustrate this point, the vehicles now in use in the United States may be divided into three groups. The first group contains those automobiles having a conventional chassis on which the vehicle body is mounted. The chassis includes a main frame which is usually narrower than the automobile and the wheel tread spacing. The second group includes automobiles of the "frameless" type, so called because they do not have a separate chassis frame. The body and frame are unitary. Automobiles of this type include Nash, Hudson and Willys. The third group of automobiles embraces a large number of sport cars. These sport cars are of a variety of constructions, both from the chassis and body standpoint, and usually have a wheel tread width substantially narrower than that commonly found on automobiles manufactured in the United States. Consequently it is not possible conveniently to service the cars of the third group on conventional lifts because the track or rail spacing is not sufficiently narrow to fit the vehicle.

It is the primary object of this invention to provide a new and improved vehicle lift which may be used with any type of automobile and which incorporates adjustable means so that the same lift can be used with all automobiles of the three groups generally described hereinabove.

It is a further object of this invention to provide a lift having the above objective which lifts the vehicle by engaging a part of the lift structure with either the chassis or the frame of the vehicle at strategic points.

Another object is to provide a lift of the frame pick-up type wherein all adjustments of the lift structure may be made from one side of the lift.

Another object of this invention is to provide a vehicle lift engaging structure of the frame pick-up type which may be used with any conventional lift operating mechanism.

Other objects and advantages will become apparent from the following description taken in conjunction with the accompanying drawings, wherein:

Fig. 1 is a plan view of the lift of this invention and illustrates the adjustability feature;

Fig. 2 is a side view showing the lift in lowered position;

Figs. 3, 4 and 5 are end views of the lift in raised position illustrating how the lift may be used with vehicles of different sizes and constructions; and Fig. 6 is an enlarged fragmentary sectional view taken substantially along the line 6—6 of Fig. 1.

Referring to the drawings, the vehicle lift designated in its entirety by the reference character 10 comprises a superstructure 12 on which the vehicle is supported and a lift operating mechanism 14. The operating mechanism is not shown in detail but includes a cylinder 16 in which is reciprocable a plunger 18 and may be supplied with operating fluid under pressure in the well known manner. The lift mechanism 14 may be of the type illustrated in Lawrence F. Jaseph Patent No. 2,254,699, granted September 2, 1945, for a Lift. The lift cylinder 16 is sunk into the ground 19 and the lift superstructure or vehicle supporting structure 12 in its lowermost position nestles into a recess 20 formed in the ground or in the floor of the service station or the garage in which the lift 10 is installed. The lift operating mechanism 14 is of the type wherein the reciprocable plunger 18 has its upper end projecting from the upper open end of the cylinder 16 in a fluid-tight sealed relationship. The plunger 18 may be raised to any desired height and held at that height by fluid pressure in the mechanism 14.

The lift superstructure 12 includes a central spider 22 which is secured to the upper closed end of the plunger 18 by any suitable means, such as the bolts 24. The central spider 22 has four integral legs 26 extending or projecting radially of the plunger 18.

The outer end of each spider leg 26 is formed with a pair of hinge parts 28 which are adapted to cooperate with a pair of hinge parts 30 formed at the inner ends of a swingable adjustable vehicle lifting member or arm 32 which is pivoted to the leg 26 by means of a pintle 34 passing through the hinge parts 28 and 30. The pivotal connections between the arms 32 and the spider legs 26 are equidistantly spaced from the axis of the plunger 18. The outer end of each arm 32 is formed with a generally circular seat 35 to which a rubber or rubberlike pad 36, vulcanized to a mounting plate 38, is secured by suitable means such as a bolt or bolts 40. The pad 36 provides a cushion directly to engage the chassis or body part and prevents marring the vehicle, particularly when the lift is used with those automobiles which are lifted by engagement of the superstructure 12 against the underside of the frame sills as will be more fully explained hereinafter. The pad 36 also prevents slippage between the vehicle and the lift superstructure 12.

As seen in Fig. 1, alternate lifting arms 32 are provided with ears 42 projecting inwardly of the hinge pintle 34 and directed generally toward the center of the lift or the lift plunger 18. The ear is formed with a small hole or opening 44 into which a hooked end 46 of a linking rod 48 is pivotally engaged. The opposite end of the rod is hooked at 50 so as to be inserted into a hole 52 formed in the lifting arm 32 at the opposite side of the lift, the hole 52 being located outwardly of the hinge pintle 34. By means of this linking connection between the pairs of lifting arms 32 on opposite sides of the lift the arms of each pair may be moved inwardly and outwardly together merely by moving one of the pair. Thus the attendant can properly adjust the arms on both sides of the lift without having to move completely about the lift and adjust each arm individually. It is preferred that the pintle 34 have a tight fit with the hinge parts 28 and 30 so that the arms 32 will not swing freely but must be moved with a slight amount of force into the adjusted position. In this way the arms will be maintained in the adjusted position and will properly engage the underside of the vehicle desired to be raised for servicing.

Figs. 3, 4 and 5 illustrate different positions of the arms 32 of the vehicle lift as it is used with automobiles of different sizes and constructions. In these views the automobiles are diagrammatically shown so as not to interfere with a clear illustration of the lift 10 and its parts.

Fig. 4 shows the adjustable pick-up members or arms 32 in an intermediate position (the full line position of Fig. 1) wherein the cushion pads 36 at the outer ends of the arms are on opposite sides of the lift and are spaced apart a distance properly to engage the lower face of a vehicle chassis frame 54. This figure illustrates the use of the lift 10 with automobiles of conventional construction. The vehicle is driven over the lowered lift from either the right or the left (Fig. 1) and stopped with its center over the left plunger 18. Since the superstructure 12 is very flat it does not in any way obstruct the movement of the car onto and off the lift. The attendant adjusts the arms 32 so that the cushion pads are located below the chassis frame 54. The central part of the frame is flat along its lower face and consequently no blocks or attachments are necessary properly to engage the lift structure with the vehicle. The mechanism 14 is operated to raise the lift superstructure 12 to engage the frame 54 and then to raise the vehicle to the desired height. After servicing, the vehicle is lowered and then driven off the lift which has lowered to the position of Fig. 2.

When the lift 10 is to be used in raising a vehicle such as a Nash, Hudson or Willys, after the car has been moved into position the arms 32 are swung outwardly to the position shown in Fig. 5 (the outer dash-dot line position of Fig. 1) so that the pads 36 are spaced apart a distance sufficient to engage the body sills 56 which form the outer and lower main body frame members. Inasmuch as the lengthwise spacing of the arms as shown in Fig. 1 is substantially less than the distance between the front and rear wheels of the vehicle, these arms may be swung outwardly between the front and rear wheels. The pads 36 protect the body, which extends down to cover the outer sides of the sills, from damage or unintentional marring as the vehicle is raised and lowered. When the vehicle is lowered at the conclusion of the servicing, the arms 32 are swung inwardly to permit the vehicle to be driven from its position over the lift.

Fig. 3 illustrates the position of the arms 32 when the vehicle lift 10 is used for raising a sports car which has a substantially narrower chassis frame 58 than the conventional chassis frame 54. The pads 36 engage the underside of the frame 58 when the vehicle lift is used in raising the vehicle for servicing or repair. The arms 32 in such position are shown in dotted lines in Fig. 1.

It is, of course, clear that the linking members 48 may be omitted in which case the four frame pick-up arms 32 must be individually adjusted.

From the foregoing description it is clear that the lift forming the subject matter of this invention may be used with equal ease and facility with all types and constructions of vehicles, and it is not necessary to modify the lift in any way or to provide the lift superstructure 12 with any blocks or accessories for engaging the chassis frame or the body frame.

While a preferred embodiment of the vehicle lift constituting this invention has been shown and described, it will be apparent that numerous modifications and variations thereof may be made without departing from the underlying principles of the invention. It is, therefore, desired by the following claims to include within the scope of the invention all such variations and modifications by which substantially the results of this invention may be obtained through the use of substantially the same or equivalent means.

What is claimed as new and desired to be secured by United States Letters Patent is:

1. In a vehicle lift of the type having a cylinder and a reciprocable plunger projecting therefrom, the combination of a central spider rigidly affixed to the projecting end of the lift plunger, said spider having four radially and outwardly extending legs arranged transversely of the lift plunger, two pairs of adjustable pick-up members, one pick-up member being pivotally mounted on the outer end of each leg to extend outwardly therefrom, linking rods interconnecting the pick-up members of each pair for simultaneous inward and outward adjusting movement, each pick-up member having a surface adapted to engage the underside of the chassis frame or body frame of a vehicle as the plunger is raised in the cylinder thereby to lift the vehicle in such manner as to provide free access to the underside of the vehicle.

2. In a vehicle lift of the type having a cylinder and a reciprocable plunger projecting therefrom, the combination of a central spider rigidly affixed to the projecting end of the lift plunger, said spider having four radially and outwardly extending legs arranged transversely of the lift plunger, two pairs of adjustable pick-up members, pivot means mounting one of said pick-up members on the outer end of each leg to extend outwardly therefrom, one pick-up member in each pair having an ear projecting inwardly of said means pivoting said pick-up member to said spider leg, and a linking rod interconnecting said ear to said other pick-up member of said pair and being connected to said last named pick-up member at a point outwardly of said pivot means so that said pick-up members of each pair may be adjusted inwardly and outwardly together, each pick-up member having a surface adapted to engage the underside of the chassis frame or body frame of a vehicle as the plunger is raised in the cylinder thereby to lift the vehicle in such manner as to provide free access to the underside of the vehicle.

3. A lift for elevating an automotive vehicle above a floor surface to provide access to the underside of the vehicle, wherein the vehicle has front and rear wheels and a pair of transversely spaced longitudinally extending side frame sections having exposed undersides and including portions arranged between the front and rear wheels, said lift including a single reciprocable operating member located substantially intermediate the frame portions and between the front and rear wheels when the vehicle is in a position to be elevated, and a superstructure supported solely on said operating member, said superstructure including a spider rigidly affixed to said operating member and having at least four radially and outwardly extending legs arranged transversely of said operating member, an adjustable member swingably mounted on the outer end of each leg and extending outwardly therefrom, said swingably mounted members providing transversely spaced portions for engaging the undersides of the vehicle frame portions at longitudinally spaced positions thereon between the front and rear wheels, with said superstructure being located within the transverse dimension of the vehicle and between the front and rear wheels when the vehicle is in a position to be elevated, said swingably mounted members being arranged in pairs, and a linking rod pivotally secured to the members of each pair to interconnect them for simultaneous inward and outward adjusting movement, whereby a single superstructure may be used for vehicles the frame sections of which are differently transversely spaced by swinging said swingably mounted members into positions so as to engage said superstructure portions against the undersides of the frame sections when said superstructure is moved upwardly.

4. A lift for elevating an automotive vehicle above a floor surface to provide access to the underside of the vehicle, wherein the vehicle has front and rear wheels and a pair of transversely spaced longitudinally extending side frame sections having exposed undersides and including portions arranged between the front and rear wheels, said lift including a single reciprocable operating member located substantially intermediate the frame portions and between the front and rear wheels when the vehicle is in a position to be elevated, and a superstructure supported solely on said operating member, said superstructure including a spider rigidly affixed to said operating member and having at least four radially and outwardly extending legs arranged transversely of said operating member, an adjustable member pivotally secured to the outer end of each leg to extend outwardly therefrom, said adjustable members providing transversely spaced portions for engaging the undersides of the vehicle frame portions at longitudinally spaced positions thereon between the front and rear wheels, with said superstructure being located within the transverse dimension of the vehicle and between the front and rear wheels when the vehicle is in a position to be elevated, said adjustable members being arranged in pairs with one member in each pair having an ear projecting inwardly of its pivotal connection to its respective spider leg, and a linking rod interconnecting said ear to said other adjustable member of said pair and being connected to said other adjustable member at a point outwardly of its pivotal connection to its respective spider leg so that the members of each pair may be adjusted inwardly and outwardly together, whereby a single superstructure may be used for vehicles the frame sections of which are differently transversely spaced by pivoting said adjustable members into positions so as to engage said superstructure portions against the undersides of the frame sections when said superstructure is moved upwardly.

5. A lift for elevating an automotive vehicle above a floor surface to provide access to the underside of the vehicle, wherein the vehicle has front and rear wheels and a pair of transversely spaced longitudinally extending side frame sections having exposed undersides and including portions arranged between the front and rear wheels, said lift including a single reciprocable operating member located substantially intermediate the frame portions and between the front and rear wheels when the vehicle is in a position to be elevated, and a superstructure supported solely on said operating member, said superstructure including a spider rigidly affixed to said operating member and having at least four radially and outwardly extending legs arranged transversely of said operating member, an adjustable member swingably mounted on the outer end of each leg and extending outwardly therefrom, said swingably mounted members providing transversely spaced portions for engaging the undersides of the vehicle frame portions at longitudinally spaced positions thereon between the front and rear wheels, with said superstructure being located within the transverse dimension of the vehicle and between the front and rear wheels when the vehicle is in a position to be elevated, said swingably mounted members being arranged in pairs, and linking means interconnecting the members of each pair for simultaneous inward and outward adjustment so that the positions of said swingably mounted members may be adjusted from one side of the lift, whereby a single superstructure may be used for vehicles the frame sections of which are differently transversely spaced by swinging said swingably mounted members into positions so as to engage said superstructure portions against the undersides of the frame sections when said superstructure is moved upwardly.

References Cited in the file of this patent

UNITED STATES PATENTS

| | | |
|---|---|---|
| 1,653,960 | Halstead et al. | Dec. 27, 1927 |
| 1,938,550 | Todd | Dec. 5, 1933 |
| 2,458,986 | Frey | Jan. 11, 1949 |
| 2,593,635 | Walker | Apr. 22, 1952 |